United States Patent Office 3,115,479
Patented Dec. 24, 1963

3,115,479
LACQUERS
Erwin Windemuth and Wilhelm Bunge, Leverkusen, and Karl-Heinz Mielke, Cologne-Stammheim, Germany, assignors, by mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed Apr. 8, 1957, Ser. No. 651,137
Claims priority, application Germany Apr. 9, 1956
12 Claims. (Cl. 260—47)

This invention relates generally to blocked or hindered organic polyisocyanates and, more particularly, to solutions, lacquers, films, coatings, impregnations and the like, prepared from a hindered or blocked isocyanate.

The organic polyisocyanates and particularly the diisocyanates have become commercially important in the preparation of polyurethane plastics by chemical reaction of the NCO groups with an organic polyhydroxy compound. Because of their chemical composition, the isocyanates are very reactive with groups containing an active hydrogen atom, such as, for example, an hydroxyl group, a carboxyl group, an amine group and the like.

It has been proposed heretofore to react the diisocyanate with a blocking compound, such as, for example, a monohydroxy compound, to form adducts which can be treated to bring about reformation of the isocyanate. Phenols, compounds containing enolizable hydrogen and secondary aromatic amines, for example, have been suggested as suitable compounds for reacting with the isocyanate to form an adduct which will dissociate into the starting components upon heating to a temperature of about 150° C. or higher. These reaction products are commercially referred to as hindered or blocked isocyanates and are particularly advantageous for use in lacquers where it is desirable to prepare a solution or mixture of the polyhydroxy compound and isocyanate which is storage stable. The hindered or blocked isocyanates will not react with the polyhydroxy compound in the solution or mixture until dissociation of the hindered or blocked isocyanate has been brought about by heating or other means. The monomeric masked isocyanates are not entirely suitable for making lacquers because of their relatively high vapor pressure at room temperatures which results in the loss of isocyanate and the presence of toxic fumes.

It has also been proposed heretofore to prepare dimers of the aromatic isocyanates which can be heated to regenerate the original isocyanate. In German Patent 951,168, for instance, a process is described for making thermal stable polyisocyanates of relatively high molecular weight by the polymerization of organic polyisocyanates. In accordance with that process, isocyanates in which at least one NCO group is attached to an aromatic nucleus are polymerized by heating in the presence of a tertiary amine catalyst. The dimers produced by this process have the disadvantage, however, of being relatively unstable during storage and, furthermore, it has been very difficult to constantly produce a product having a particular free isocyanate content. Such compounds have not been entirely suitable for use in making lacquers because of the lack of uniformity in the product obtained from the polymerization. The dimers, therefore, have not been used extensively in formulating lacquers and coatings.

It is therefore an object of this invention to provide novel compositions yielding lacquers, films, impregnations, coatings and the like, said compositions containing an isocyanate devoid of the foregoing disadvantages. Another object of the invention is to provide lacquers particularly advantageous for coating electrical conductors. Still another object of the invention is to provide a method for making lacquers and coatings from polyhydroxy compounds and organic isocyanates particularly well suited for use in coating metals, plastics, rubber and the like. A still further object of the invention is to provide hindered or blocked polymeric polyisocyanates in solution with a polyhydroxy compound which is storage stable and adapted for coating electrical conductors and other materials without introducing hazardous physiological conditions. Another object of the invention is to provide a novel method for coating electrical conductors and the like with an improved isocyanate-modified organic polyhydroxy compound. Still another object is to provide novel hindered or blocked polyisocyanates.

As pointed out in our co-pending application Serial No. 626,577, filed December 6, 1956, now U.S. Patent 2,952,665, of which this application is a continuation-in-part, organic polyisocyanates and particularly organic diisocyanates may be reacted with a monohydroxy compound while dissolved in a suitable solvent and may then be polymerized to form a hindered or blocked trimeric diisocyanate which, upon heating to a temperature of about 140° C. or higher will dissociate into the free trimeric diisocyanate and the monohydroxy compound. The polymerization is brought about by heating the solution of the reaction product obtained from the monohydroxy compound and the polyisocyanate, preferably in the presence of a suitable polymerization catalyst.

The following equations are representative of the chemical reactions involved:

(1)  R'—OH+OCN—R"—NCO
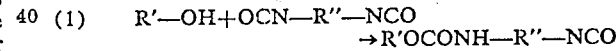
→R'OCONH—R"—NCO (2)
3R'OCONH—R"—NCO ⟶
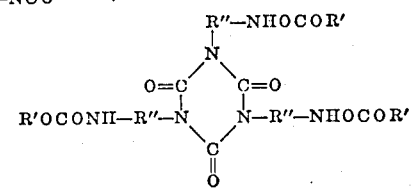

wherein R" is a divalent organic radical which may contain free NCO groups and R' is a monovalent organic radical. The reaction in Equation 1 is a reversible reaction, the direction of which is controlled by the temperature. At lower elevated temperatures of 50° C. or more, depending upon the particular monohydroxy compound used, the adduct at the right of the arrow is favored, while at higher temperatures, usually 140° C. or higher, the adduct dissociates into the compounds at the left of the arrow. Although Equation 2 indicates that a trimer is formed and in most instances a trimer is preferred, the polymerization may be conducted under such conditions of temperature and time that polymers of higher molecular weight are obtained and such higher polymers are also contemplated by the invention. The polymers may be represented generically by the formula, (R'OCONR"NCO)

wherein R' and R" have same meaning as above and $n$ is an integer. At temperatures above 140° C., the above blocked trimeric diisocyanate and similar blocked higher polymeric diisocyanates are split into the underlying free polymeric diisocyanate and the blocking monohydroxy compound, for example, (3)
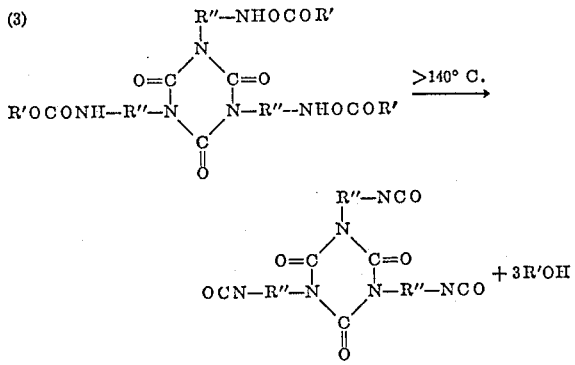

Any suitable organic polyisocyanate, including aliphatic cycloalkylene, aromatic and nuclear-substituted aromatic isocyanates, may be utilized in preparing the hindered or blocked isocyanate, such as, for example, hexamethylene diisocyanate, m-phenylene diisocyanate, 1 - alkyl - benzene - 2,4 - diisocyanate, 1 - alkyl - benzene-2,5 - diisocyanate, 2,6 - dialkyl - benzene - 1,4 - diisocyanate, 1 - chlorobenzene - 2,4 - diisocyanate, dicyclohexyl methane diisocyanate, 3,3'-dimethoxy diphenyl methane-4,4'-diisocyanate, 1-nitrobenzene-2,4-diisocyanate, 1-alkoxy - benzene - 2,4 - diisocyanate, 1 - alkyl - benzene-2,6-diisocyanate, m-xylylene diisocyanate, 1,3-dimethyl-4,6 - bis - ($\beta$ - isocyanatoethyl) - benzene, hexahydrobenzidine-4,4'-diisocyanate, 1-($\alpha$-isocyanato ethyl)-2,4-diisocyanato benzene, 2,4,4'-triisocyanato diphenyl ether and the like.

The organic polyisocyanates may be reacted with any suitable organic monohydroxy compound or other suitable compounds to form the adduct of Equation 1. Typical examples of suitable compounds include methanol, ethanol, butanol, isobutanol, octylalcohol, cyclohexanol, benzyl alcohol, phenol, cresols, xylylenols, $\beta$-chloroethyl alcohol, glycide, ethylene glycol, lactic acid esters, aldols, ketols, ethanolamine chlorohydrate, hydroxybenzaldehyde and the like. The number of isocyanate groups transformed into corresponding urethane groups will depend upon the proportions of the starting components, the temperature, the catalyst and other reaction conditions. In some instances, only some of the isocyanate groups will react with hydroxyl groups, while in other instances, substantially all of the isocyanate groups may react. It is preferred to use the components in the molar ratio of from about 1 part of the polyisocyanate to from about 0.6 to about 4 parts of the monohydroxy compound or other suitable compound. When a diisocyanate is used a ratio of about 1:1 has been found particularly advantageous, as indicated hereinbefore, where aliphatic, araliphatic or hydroaromatic alcohols may be utilized and, of course, mixtures of the different monohydroxy compounds may be used.

Although the invention has been described for the sake of convenience with respect to the use of a monohydroxy compound for the preparation of the adduct and the resulting polymer, any other suitable compounds may be used for preparing the hindered or blocked polyisocyanate including any suitable secondary amine, like diphenyl amine, o-ditolyl amine, m-ditolyl amine, p-ditolyl amine, N-phenyl toluidine, N-phenyl xylidine, phenyl-$\alpha$-naphthylamine, phenyl-$\beta$-naphthylamine, carbazole, and the nuclear-substituted aromatic compounds such as 2,2'-dinitrodiphenyl amine and 2,2'-dichloro diphenyl amine, or any compound containing enolizable-hydrogen including, for example, aceto-acetic ester, diethyl malonate, ethyl n-butyl malonate, ethyl benzyl malonate, acetyl acetone and acetonyl acetone. These compounds may be substituted for the monohydroxy compound of Equation 1 hereinbefore and may be substituted for the monohydroxy compounds by those skilled in the art in the examples and elsewhere in the specification.

In practicing the invention, the isocyanate and monohydroxy compound are reacted together with or without being dissolved in a suitable solvent or mixture of solvents. Dissolution of the components may be accelerated by heating to an elevated temperature. Usually temperatures of about 50° C. or above are preferred.

Any suitable solvent for the isocyanate and the monohydroxy compound may be utilized. For example, esters, ketones, phenols and chlorinated hydrocarbons may be used for dissolving the polyisocyanates. Usually these compounds are also suitable for dissolving the monohydroxy compounds and they are also solvents for the masked polymerized isocyanate. Specific examples of suitable solvents include cresol, naptha boiling at from about 100° C. to about 130° C., methyl glycol acetate, ethyl acetate, xylenol, ethyl glycol acetate, butyl acetate, toluene, chloro benzene, dichloro benzene or mixtures thereof, and the like.

After the adduct has been formed, the reaction mixture may be heated until polymerization has occurred. Usually a suitable catalyst, such as, for example, a tertiary amine, is added to accelerate polymerization. Catalytic amounts of from about 0.005 to about 2.5 percent of the tertiary amine or other catalyst may be utilized. Any suitable catalyst may be used, but it is preferred to use any suitable tertiary amine including, for example, dimethyl aniline hexahydrodimethyl aniline, methyl morpholine, ethyl morpholine, permethylated diethylene triamine or triethylene tetramine, urethanes formed from about 1 mol of N,N'-dialkylamine ethanol and about 1 mol of phenyl isocyanate or cyclohexyl isocyanate, diurethanes formed from about 1 mol of normal N-alkyldiethanol amine and about 2 mols of phenyl or cyclohexyl isocyanate, normal N-dialkyl piperazine and N,N'-dimethylethanol amine, mixtures thereof, dimethyl cetyl amine, or the like. The polymerization can be carried out with or without a solvent. The solvents used in preparing the primay adduct may be used as the solvents during the polymerization. Solvents which have been found particularly well suitable include butyl acetate, methyl glycol acetate, chlorobenzene or dichlorobenzene. In those instances where a phenol is used in preparing the primary adduct which phenol is also a solvent, an excess of the phenol can be used in preparing the adduct and the unreacted phenol remaining may be used as the solvent in the polymerization step. Then, tertiary amine or other catalysts may be used to accelerate the reaction between the monohydroxy compound and the polyisocyanate in the preparation of the primary adduct if desired.

It is preferred that the polymerization be extended only to the point where the resulting compound is soluble in organic solvents. Usually when more than about 50 percent of the available isocyanate groups in the starting polyisocyanate have been polymerized, solubility in organic solvents is reduced. The extent of the polymerization can be determined analytically and can be stopped at the desired point by adding any suitable acidic compound, such as, for example, hydrohalic acids, carboxylic acids or carboxylic acid chlorides.

If desired, it is also possible to produce products with the same degree of polymerization but with a smaller content of masked isocyanate groups concurrently using calculated amounts of monoisocyanates or monoamino compounds. The concurrent use of monoisocyanates leads to cyclic trimers containing an isocyanuric acid ring formed by three isocyanato groups, one or two of them being attached to a monoisocyanate molecule and the remaining two or one isocyanato groups attached to diisocyanate molecules. It is easily to be seen that such a trimer has one or two side chains which contain no functional groups at all because of the monoisocyanate used in its formation. If a monoamino compound is concurrently used with the monohydroxy compound, the calculated amount of urea groups which are not broken up when heated is formed instead of urethane groups. Phenylisocyanate, α-naphthyl isocyanate or dibutyl amine are, for example, suitable for this purpose. These modified compounds are expediently added to the reaction products of diisocyanates and hydroxy compounds.

Furthermore, small amounts of polyhydroxy compounds or polyamino compounds can be concurrently used for modifying the products obtained from the polymerization process. In this case two or more trimers containing an isocyanuric acid ring may be linked together over a carbon chain derived from the polyhydroxy or polyamino compound.

The hindered or blocked polyisocyanate polymer produced by the above reactions, and preferably the trimer of Equation 2, has been found particularly advantageous for preparing lacquers and coatings. The vapor pressure is lower than that of lacquers containing the heretofore available isocyanates and the films produced have improved physical characteristics. The invention thus contemplates lacquers and other coating compositions containing the block polyisocyanate polymer and an organic compound having reactive hydrogen atoms which will react to form an insoluble polyurethane plastic. The invention also contemplates dried films, coatings, impregnations and the like which embody the reaction product of the blocked isocyanate polymer and an organic compound having at least two reactive hydrogen atoms.

The polymer provided by this invention, that is, the blocked or hindered polymerized isocyanate, may be reacted with any suitable compound having at least two reactive hydrogen atoms to produce the polyurethane product. The condensation is conducted at a temperature at which the masked isocyanate polymer will dissociate into a polymer having free NCO groups. Examples of suitable organic compounds having reactive hydrogen atoms include linear or branched, saturated or unsaturated polyester, polyester amides, polyamides containing hydroxyl groups, such as those prepared by those condensing polyhydric alcohols and polybasic acids with the concurrent use of diamines and amino alcohols, polyamines and polyalcohols, including, for example, cellulose and its derivatives and polyvinyl alcohol, alkyd resins modified with saturated or unsaturated acids, polyethers having terminal hydroxyl groups, polythioethers having terminal hydroxyl groups, phenol formaldehyde resins, xylene formaldehyde resins, urea formaldehyde resins and ethoxy resins which may have been modified with natural or synthetic resins. If desired, mixtures of the above compounds may be reacted with the masked polymerized polyisocyanates. The invention, therefore, contemplates a lacquer containing one or more of the foregoing compounds in admixture with one or more blocked or hindered polymerized isocyanates described hereinbefore.

The proportions in which the compound having active hydrogen and the masked polyisocyanate polymer are mixed depends upon the number of reactive groups in the isocyanate compound and the substance to be reacted therewith. For most purposes, it is preferred to use a sufficient amount of one reactant to react with all the reactive groups of the other. In some cases, however, it is advantageous to use a higher proportion of one or the other of the components to provide a product having certain properties. For example, a hard film is produced when highly cross-linked polyesters are used while a soft elastic film is produced by slightly cross-linked polyesters.

A specific lacquer composition which has been found to be particularly advantageous in the process of the present invention consists of a linear polyester prepared from adipic acid, maleic acid, ethylene glycol and butanediol which is mixed 1:1 with a masked isocyanate polymer the polymer being in excess over the hydroxyl groups of the polyester. This composition is dissolved in an ester ketone mixture having a solid content of about 30 to 40 percent. The lacquer obtained by applying this composition to a surface is hardened at about 160 to 180° C.

The invention also contemplates lacquers and coating compositions containing certain additive materials which do not react with the isocyanate but are included in the lacquer formulation to lend certain desirable properties thereto. For example, plasticizers may be included to improve the elasticity of the finished film. The bonding strength or the resistance to rubbing, the gloss, the hardness or the flow properties of the lacquer or dried film resulting therefrom or the water or moisture-proof characteristics of the resulting film may be improved by incorporating additives in the lacquer. The electrical properties, for example, the conductivity of the insulation, may be decreased, the rupture strength of the dried film may be increased or the dielectric losses may be lowered or the dielectric constants of the lacquer may be modified by means of additives. In addition to plasticizers, any other additive desired which will not react undesirably with the isocyanate or other ingredients of the lacquer may be used. For example, any organic or inorganic compound, natural or synthetic resins, pigments, dyes, or fibrous materials may be incorporated in the lacquer. The lacquer may also include a suitable catalyst which accelerates the reaction between the blocked isocyanate and the organic compound having at least two reactive hydrogens in the lacquer. Examples of such catalyst include alkyl amines or aryl amines, salts thereof, amides, reaction products of amines or ammonia with aldehydes or ketones and the like.

As indicated hereinbefore, the reaction between the blocked polymerized isocyanate which brings about final hardening of the lacquer is brought about by heating the lacquer to a temperature, usually 140° C. or above, at which the NCO groups are liberated.

The lacquers provided by this invention have many uses, including, for example, the lacquering of various types of metal, such as iron, aluminum, copper or bronze, coating ceramics, rubber or plastics and electrical conductors, for impregnating fabrics, including plastic and fiber glass fabrics, for impregnating paper or for impregnating various types of fabric insulation or electrical conductors, such as, for example, conductors covered with textiles, silk, plastic or asbestos threads. Magnet coils of electric motors and other appliances may be impregnated with the lacquer, or metallic foils suitable as condenser foils may be coated with the lacquer.

The new lacquer compositions provide films which have a better stability against heat. This can be seen from the decrease in weight at higher temperature which in qual periods of time is less than heretofore. Thus, for instance, heating a wire, lacquered in the known manner, for 7 days to 250° C. results in a decrease in weight of 35–40 percent calculated on the film surface. A wire lacquered according to the present invention and treated in the same way as above shows even after 14 days a decrease in weight of 12–14 percent only.

A particularly advantageous lacquer for coating electrical conductors is prepared from an hydroxyl polyester which has, in turn, been prepared from a phthalic acid or derivatives thereof. In other words, a polyester containing in its chain the group

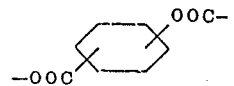

has been found particularly advantageous for use in preparing a lacquer for coating electrical conductors. The phthalic acid radical may be derived from terephthalic acid, terephthalic dimethyl ester, isophthalic acid, phthalic anhydride or the like.

The phthalic polyesters used in the practice of the invention may be prepared by thermal esterification of their components. Thus, phthalic anhydride or terephalic acid may be heated with a polyhydric alcohol, such as ethylene glycol or glycerol or a mixture thereof, to a temperature within the range of about 100° C. to about 250° C. while distilling off the water formed in the esterification. The components are used in such proportions as to form a polyester containing free terminal hydroxyl groups. Alternatively, the terephthalic acid polyesters used as lacquer and coating components in accordance with the invention may be obtained by ester interchange from dimethyl terephthalate and a polyhydric aliphatic alcohol, such as ethylene glycol or glycerol. The direct esterification as well as the ester interchange reaction may be accelerated by the use of suitable catalysts, such as zinc acetate, lead acetate and the acetates or oxides of other heavy metals.

The polyester may be prepared entirely from one of the phthalic acids or the anhydride or ester, but it is preferred to prepare it from a mixture of the phthalic compound with another dicarboxylic acid or anhydride. Examples of suitable acids for making the polyester, either in combination with the phthalic acid or without phthalic acid, include adipic acid, sebacic acid, succinic acid, maleic acid, maleic anhydride, cyclohexane-1,2-dicarboxylic acid or any of the other known suitable polybasic acids including those disclosed in U.S. Patent 2,764,565. These acids are reacted with a suitable polyhydric compound, such as, for example, ethylene glycol, ethanol amine or other suitable polyhydroxy compound including those disclosed in the aforesaid patent.

A specific lacquer composition which may be preferably used in the process of the present invention is prepared from a polyester consisting of terephthalic acid, ethylene glycol and glycerol, and, for instance, 20 to 50 percent, preferably about 30 percent, of a masked isocyanate polymer the OH groups of the polyester being in excess over the NCO groups of the polymer. The lacquer composition is preferably employed in a cresol xylene solution having a solid content up to 30 percent. The stoving temperature of such a composition is about 160 to 180° C.

Example 1

About 100 parts by weight of a polyester with about 5.5% of hydroxyl groups and an acid number of 4.1 obtained by esterifying, about 2 mols of adipic acid, about 2 mols of terephthalic acid, about 3 mols of trimethylol propane, and about 2 mols of ethylene glycol are dissolved while stirring in a mixture of about 140 parts of cresol and about 60 parts of solvent naphtha at from about 100° C. to about 130° C. To this solution is added about 100 parts by weight of about a 30% solution of a masked isocyanate obtained from about 3 mols of toluylene diisocyanate and about 3 mols of phenol on heating and with addition of small amounts of a tertiary amine. A mixture of cresol and solvent naphtha in the ratio of 70:30 is also chosen as solvent for the isocyanate component.

A lacquer is obtained which yields a hard elastic film on being baked at a temperature higher than about 180° C.

Example 2

About 100 parts by weight of a polyester with about 5.3% of hydroxyl groups prepared by thermal condensation of about 2 mols of adipic acid, about 3 mols of maleic anhydride, about 4 mols of butylene glycol, and about 2 mols of trimethylol propane are dissolved in about 200 parts by weight of a solvent mixture consisting of methyl glycol acetate, butanol and ethyl acetate in the ratio 2:1:1 and mixed with about 150 parts by weight of about a 33% solution of a masked isocyanate, obtained from about 2 mols of toluylene diisocyanate, about 1 mol of phenyl isocyanate and about 3 mols of phenol upon heating and with addition of small amounts of a tertiary amine. The final hardening is effected by baking at a temperature of above about 180° C. This combination constitutes a lacquer which is particularly suitable for impregnating glass silk fabrics.

Example 3

About 100 parts by weight of a polyester with about 5.6% of hydroxyl groups obtained from about 8 mols of terephthalic dimethyl ester, with about 6 mols of ethylene glycol, about 1 mol of trimethylol propane, and about 2 mols of glycerine are dissolved under reflux at about 130° C. in a mixture of about 160 parts by weight of cresol, about 160 parts by weight of xylylenol and about 80 parts by weight of solvent naphtha, while stirring. This solution has added thereto about 30 parts by weight of a masked isocyanate, which has been obtained from about 3 mols of toluylene diisocyanate and about 3 mols of butanol by heating with addition of small amounts of a tertiary amine. A lacquer is obtained which, upon being baked at a temperature higher than about 200° C., yields a hard, elastic film which is very resistant to temperature.

This lacquer is particularly suitable for lacquering magnetic wires.

Example 4

About 100 parts by weight of a polyester with 7.2% of hydroxyl groups obtained from about 2 mols of maleic anhydride, about 2 mols of terephthalic dimethyl ester, about 1 mol of trimethylol propane, about 1 mol of ethylene glycol, and about 1 mol of glycerine are dissolved at about 100° C. and while stirring in a mixture of about 150 parts of cresol, about 250 parts of ethyl glycol acetate, about 100 parts of butyl acetate and about 50 parts of solvent naphtha. To this solution is added about 35 parts by weight of a masked isocyanate which has been obtained from about 3 mols of m-phenylene diisocyanate and about 3 mols of cresol by heating and with addition of small amounts of a tertiary amine. About 50 parts by weight of a xylene formaldehyde resin with a low viscosity factor are also added and this lacquer is passed together with about 50 parts by weight of red iron oxide through a color-grinding mill. A hard stoving lacquer is obtained which hardens at temperatures higher than about 175° C.

Example 5

About 100 parts by weight of a polyester with an hydroxyl content of about 10.5% prepared by thermal condensation of about 2 mols of phthalic anhydride, about 2 mols of trimethylol propane, and about 1 mol of ethylene glycol are dissolved at about 80° C. in a mixture of about 200 parts of ethyl glycol acetate, about 100 parts of butyl acetate and about 100 parts of cresol. This solution has added thereto about 70 parts by weight of a masked isocyanate, which is formed from about 3 mols of 1,4-cyclohexane diisocyanate and about 3 mols of phenol by heating and with addition of small amounts of a tertiary amine. After completing the dissolution, about 150 parts by weight of about a 15% solution of a polyamide from ε-caprolactam in cresol are added. A lacquer is obtained which hardens at temperatures higher than about 180° C. and is suitable as an insulation for electric conductors.

Example 6

About 100 parts by weight of a polyester obtained from about 1 mol adipic acid, about 1 mol maleic anhydride, about 1 mol terephthalic dimethyl ester, about 2 mols trimethylol propane, 1 mol glycerine, about 2 mols octanediol, and about 1 mol 1,3-butyleneglycol are dissolved in about 600 parts by weight of a solvent mixture consisting of about 5 parts of cresol, about 3 parts of ethyl glycol acetate and about 2 parts of solvent naphtha at about 100° C. About 80 parts by weight of a masked isocyanate which has been obtained from about 3 mols of hexamethylene diisocyanate and about 3 mols of cresol by heating and with addition of small amounts of a tertiary amine are dissolved in the said solution. A lacquer is obtained which provides a good elastic film on heat-resistant plastic fabrics with a baking temperature of about 175° C.

*Example 7*

About 100 parts by weight of a polyester obtained from about 3 mols of isophthalic acid, about 2 mols of terephthalic acid, about 3 mols of glycerine, about 2 mols of ethyleneglycol are dissolved in about 500 parts by weight of a solvent mixture consisting of about 6 parts of cresol and about 4 parts of solvent naphtha at about 130° C. About 35 parts by weight of a masked isocyanate are added thereto, this isocyanate having been prepared from about 3 mols of phenylene diisocyanate and about 3 mols of phenol by heating and with addition of small amounts of a tertiary amine. The result is a lacquer which, upon being baked at temperatures higher than about 180° C. yields a hard elastic film which is very suitable for the insulation of electric conductors.

*Example 8*

About 100 parts by weight of a condensation product obtained from equal parts of a polyester, prepared from about 2 mols of terephthalic dimethyl ester; about 2 mols trimethylol propane, and about 1 mol ethylene glycol, and a polysiloxane containing hydroxyl groups and obtained by hydrolysis of about 1.00 mol of dimethyl dichlorosilane, about 1.00 mol of diphenyl dichlorosilane, about 1.40 mols of methyl trichlorosilane, and about 0.54 mol of phenyl trichlorosilane are dissolved in about 100 parts of a solvent mixture consisting of methyl glycol acetate and butanol, toluene in the ratio of 1:1:1. About 25 parts by weight of a masked isocyanate are added thereto, this isocyanate having been formed from about 3 mols of toluylene diisocyanate and about 3 mols of phenol by heating and with addition of a small amount of a tertiary amine. This lacquer hardens upon being baked at temperatures above about 170° C. and is excellently suitable for impregnating magnet coils of electrical appliances and machines.

*Example 9*

About 100 parts by weight of polyamide, which was obtained by condensation of ε-caprolactam, are dissolved in about 500 parts by weight of cresol and about 50 parts by weight of diacetone alcohol while heating. This solution has added thereto about 20 parts by weight of a masked triisocyanate, which was obtained from about 3 mols of toluylene diisocyanate and about 3 mols of cresol by heating in the presence of small amounts of a tertiary amine.

A lacquer is obtained which, upon being baked at temperatures higher than about 180° C. yields elastic and resistant films and is suitable for lacquering magnet wires.

*Example 10*

About 32 parts by weight of methanol are gradually introduced into about 160 parts by weight of 1,3-phenylene diisocyanate heated to about 90° C., some of the evaporating methanol initially returning to the reaction material again due to reflux. The formation of the methyl urethane is completed after a few minutes (isocyanate content about 20.9%). The temperature is slowly raised to about 160° C. After a short time, the temperature rises to about 240° C. without any external heating. The product now shows an isocyanate content of about 1.9%. Further heating for about 2 hours yields a resin which is spring-hard at room temperature, no longer has any free isocyanate groups and is soluble in acetone, ethyl acetate and methyl glycol acetate.

About 155 parts by weight of a polyester with about 11% of OH groups obtained by esterification of about 3 mols of adipic acid and about 4 mols of trimethylol propane are dissolved in a mixture of about 100 parts by weight of methyl glycol acetate and about 55 parts by weight of ethyl acetate.

To this solution is added a mixture of about 200 parts by weight of the above polymerization product and about 100 parts by weight of methyl glycol acetate and about 100 parts by weight of butyl acetate.

A lacquer is obtained which yields a hard elastic film on being baked at a temperature higher than about 230° C. The lacquer exhibits a particularly high resistance against chemical action.

*Example 11*

About 336 parts by weight of hexamethylene diisocyanate are heated to about 60° C. after adding 0.24 part by weight of about a 10% solution of permethylated diethylene triamine in o-dichlorobenzene and then gradually mixed with about 70.4 parts by weight of methanol while stirring. By occasional cooling, it is insured that the temperature does not exceed about 90° C. After heating for about 1 hour at about 90° C., the reaction product contains about 18.8% of isocyanate groups. In the course of about 1 hour, the product is heated slowly to from about 160° C. to about 165° C. and the reaction material is left at this temperature, a slight degree of cooling being necessary at short intervals. After heating for about 3 hours at about 170° C., practically no more free isocyanate groups can be detected. The light, highly viscous oil is clearly soluble in acetone and methyl glycol acetate.

About 200 parts by weight of this product are dissolved in about 200 parts by weight of a mixture of acetone and methyl glycol acetate (1:1). This solution is added to about 300 parts by weight of about a 50% solution of the polyester of Example 10. The lacquer hardens at temperatures higher than about 240° C. whereby an elastic non-soluble film results.

*Example 12*

About 620 parts by weight of phenol are gradually added while stirring steadily to about 1044 parts by weight of an isomer mixture of 2,4- and 2,6-toluylene diisocyanate heated to about 160° C., the temperature being kept constant. After the reaction product has been left for about 2 more hours at from about 160° C. to about 165° C., about 2.3 parts by weight of a tertiary amine obtained from about 1 mol of N-methyl diethanolamine and about 2 mols of phenyl isocyanate are added. After heating for about 10 hours at from about 170° C. to about 180° C., a spring-hard resin smelling of phenol is obtained, which is soluble in any proportion in ethyl acetate and methyl glycol acetate and no longer contains any free isocyanate groups. By heating with a N/1 dibutyl amine solution in chlorobenzene, it is possible to detect a content of about 15.9% of isocyanate groups bonded to phenol.

About 200 parts by weight of a polyester with about 8.5% of hydroxyl groups and an acid number of 4.1 obtained by esterifying about 2 mols of adipic acid, about 2 mols of terephthalic acid, about 3 mols of trimethylol propane, and about 2 mols of ethylene glycol are dissolved while stirring in a mixture of about 140 parts of cresol and about 60 parts of solvent naphtha at from about 100° C. to about 130° C. This solution has added thereto about 300 parts by weight of about a 30% solution of the above masked isocyanate. A mixture of cresol and solvent naphtha in the ratio of 70:30 is also chosen as solvent for the isocyanate component.

A lacquer is obtained which yields a hard elastic film on being baked at a temperature higher than about 180° C.

*Example 13*

About 1188 parts by weight of technical cresol mixture are added at from about 160° C. to about 170° C. gradually to about 1740 parts by weight of an isomer mixture consisting of 2,4- and 2,6-toluylene diisocyanate while stirring, the addition being so controlled that the temperature is kept between from about 160° C. to about 170° C.

After adding about 8.8 parts by weight of the tertiary amine described in Example 12, the reaction mixture is left for about 18 hours at about 160° C. The product, which is readily soluble in acetic ester, acetone and methyl glycol acetate, no longer has any free isocyanate groups and contains about 15.1% of isocyanate groups bonded to cresol.

After 100 parts by weight of a polyester with about 5.3% of hydroxyl groups prepared by thermal condensation of about 2 mols of adipic acid, about 3 mols of maleic anhydride, about 4 mols of butylene glycol, and about 2 mols of trimethylol propane are dissolved in about 600 parts by weight of a solvent mixture consisting of methyl glycol acetate, butanol and ethyl acetate in the ratio 2:1:1. The solution is mixed with about 800 parts by weight of about a 33% solution in methyl glycol acetate and cresol (1:1) of the above masked isocyanate. The final hardening is effected by baking at a temperature above about 180° C. This combination constitutes a lacquer which is particularly suitable for impregnating glass silk fabrics.

*Example 14*

About 870 parts by weight of an isomer mixture consisting of 2,4- and 2,6-toluylene diisocyanate are dissolved in about 393 parts by weight of methyl glycol acetate and heated to about 160° C. About 702 parts by weight of m-cresol are introduced in the course of about 45 minutes into the solution. After the reaction solution has been left for about 3 hours at about 160° C., about 7.8 parts by weight of the tertiary amine described in Example 12 are added. After heating for about 20 hours at about 160° C., the solution contains about 10.3% of isocyanate groups bonded to m-cresol. If about 3.1 parts by weight of benzoyl chloride are added to the solution, even further heating for about 18 hours at about 160° C. does not lead to any change of the isocyanate value obtained by amine titration. The product can be diluted in any proportion with ethyl acetate.

About 100 parts by weight of a polyester with about 5.1% of hydroxyl groups obtained from about 8 mols of terephthalic dimethyl ester, with about 6 mols of ethylene glycol, about 1 mol of trimethylol propane, and about 2 mols of glycerine are dissolved at about 130° C. in a mixture of about 160 parts by weight of cresol, about 160 parts by weight of xylylenol and about 80 parts by weight of solvent naphtha, while stirring. This solution has added thereto about 40 parts by weight of the above described approximately 80% solution of the masked isocyanate.

A lacquer is obtained which, upon being baked at a temperature higher than about 200° C. yields a hard, elastic film which is very resistant to temperature. This lacquer is particularly suitable for lacquering magnetic wires.

*Example 15*

About 139 parts by weight of diphenyl-dimethylmethane-4,4'-diisocyanate are heated with about 44 parts by weight of o-dichlorobenzene to about 80° C. About 17 parts by weight of methanol are gradually added to this solution, the temperature being maintained at from about 80° C. to about 90° C. by external cooling. After heating for about one more hour at about 90° C., an isocyanate content of about 9.9% is established. The internal temperature is raised to about 170° C. and the reaction mixture is kept for about 3 hours at this temperature. Due to this heat treatment, the isocyanate content drops to about 8.4%. About 0.14 part by weight of about a 10% solution of permethylated diethylene triamine in o-dichlorobenzene is now added, the temperature rising within about 7 minutes to about 203° C. A resin is obtained which is spring-hard at room temperature, only has about 0.3% of isocyanate groups and is soluble in ethyl acetate and methyl glycol acetate.

About 100 parts by weight of this reaction product are mixed at elevated temperature with about 1000 parts by weight of the approximately 20% polyester solution referred to in Example 14. The final hardening is effected by baking at a temperature above about 220° C. This combination constitutes a very hard lacquer which is resistant even against high temperatures.

*Example 16*

About 696 parts by weight of an isomer mixture consisting of 2,4- and 2,6-toluylene diisocyanate are initially reacted at about 160° C., as described in Example 12, with about 562 parts by weight of a technical cresol mixture. After adding about 137 parts by weight of o-dichlorobenzene, about 2.5 parts by weight of permethylated diethylene triamine are added. After further heating for about 3 hours at about 170° C., a spring-hard resinous product is obtained which is clearly soluble in any proportion in acetic ester and has about 12.0% of isocyanate groups which can be split off. If only half the amount of tertiary amine is added, the same isocyanate value is only obtained after heating for about 5½ hours at about 170° C. If only a quarter of the amount of catalyst is used it is necessary to heat for about 16 hours at about 170° C. in order to obtain the same end product.

About 100 parts by weight of a polyester with about 7.2% of hydroxyl groups obtained from about 2.0 mols of maleic anhydride, about 2.0 mols of terephthalic dimethyl ester, about 1.0 mol of trimethylol propane, about 1.0 mol of ethylene glycol, and about 2.2 mols of glycerine are dissolved at about 100° C. and while stirring in a mixture of about 150 parts of cresol, about 250 parts of ethyl glycol acetate, about 100 parts of butyl acetate and about 50 parts of solvent naphtha. This solution has added thereto at slightly elevated temperature about 35 parts by weight of the above masked isocyanate. About 50 parts by weight of a xylene formaldehyde resin with a low viscosity factor are also added and this lacquer is passed together with about 50 parts by weight of red iron oxide through a color-grinding mill.

A hard stoving lacquer is obtained which hardens at temperatures higher than about 175° C.

*Example 17*

The dicresyl urethane of toluylene diisocyanate is first of all produced from about 348 parts by weight of an isomer mixture consisting of 2,4- and 2,6-toluylene diisocyanate and about 432 parts by weight of m-cresol by heating to about 170° C. After heating with adjusted dibutylamine solution, the reaction product yields an isocyanate value of about 21.5%. About 2.72 parts by weight (=about 0.4%) of permethylated triethylene tetramine with a content of about 24% nitrogen are then added to the clear melt. After heating for about 7 hours, the melt only still has a content of about 10.7% of isocyanate groups bonded to cresol. About 6.7 parts by weight of benzoyl chloride are added and the heating to about 170° C. is extended to about 20 hours. The isocyanate content of about 10.7% determined by titration remains unchanged. The clearly transparent resinous product containing free cresol is clearly soluble in acetone.

About 100 parts by weight of a polyester with an hydroxyl content of about 10.5% prepared by thermal condensation of about 2 mols of phthalic anhydride, about 2 mols of trimethylol propane, and about 1 mol of ethylene glycol are dissolved at about 80° C. in a mixture of about 200 parts of ethyl glycol acetate, about 100 parts of butyl acetate and about 100 parts of cresol. This solution has added thereto about 200 parts by weight of the above masked isocyanate, which has been dissolved in about 100 parts by weight of methyl glycol acetate. After completing the dissolution, about 150 parts by weight of about a 15% solution of a polyamide from ε-caprolactam in cresol are added. A lacquer is obtained which hardens at temperatures higher than about 180° C. and is suitable as an insulation for electric conductors.

*Example 18*

About 163 parts by weight of n-butanol are run while stirring into about 348 parts by weight of 2,4-toluylene diisocyanate heated to about 80° C., care being taken by a small degree of external cooling that the temperature does not exceed about 100° C. After the reaction mixture has been left for about 1 hour at this temperature (isocyanate content=about 14.4%), the temperature is slowly increased. At about 150° C., about 0.51 part by weight of permethylated diethylene triamine is added without further heating. The internal temperature then rises in the course of about 1 hour to about 170° C. By titration with dibutyl amine, it is only possible to determine an isocyanate content of about 1.83%, this having assumed the value of zero after heating for about 3 hours more at about 170° C. A resin which in spring-hard at room temperature remains and this resin is clearly soluble in ethyl acetate and methyl glycol acetate. A reaction product of similar structure is obtained by using the same parts by weight of isobutanol.

About 100 parts by weight of a polyester obtained from about 1 mol of adipic acid, about 3 mols of terephthalic dimethyl ester, about 1 mol maleic anhydride, about 2 mols of trimethylol propane, about 1 mol of glycerine, about 2 mols of octanediol, and about 1 mol of 1,3-butylene glycol are dissolved in about 600 parts by weight of a solvent mixture consisting of about 5 parts of cresol, about 3 parts of ethyl glycol acetate and about 2 parts of solvent naphtha at about 100° C. At slightly elevated temperature, about 80 parts by weight of the above masked isocyanate are dissolved in the said solution. With a baking temperature above about 220° C., a lacquer is obtained which provides a good elastic film.

*Example 19*

About 237.6 parts by weight of benzyl alcohol are introduced at from about 80° C. to about 90° C. and while stirring constantly, into about 348 parts by weight of 2,4-toluylene diisocyanate, a small degree of external cooling being necessary for dissipating the heat of reaction. After heating for about 1 hour at from about 95° C. to about 100° C., the reaction product contains 12.8% of isocyanate groups. After adding about 0.58 part by weight of permethylated trimethylene tetramine, the temperature rises within a few minutes to about 170° C., the viscosity of the reaction mixture constantly increasing. After heating for about 2 hours at about 170° C., a resin is obtained which is completely soluble in acetone and ethyl acetate and which no longer contains any isocyanate groups which can be detected by amine titration.

About 100 parts by weight of a polyester obtained from about 3 mols of isophthalic acid, about 2 mols of terephthalic acid, about 3 mols of glycerine, and about 2.7 mols of ethylene glycol are dissolved in about 500 parts by weight of a solvent mixture consisting of about 6 parts of cresol and about 4 parts of solvent naphtha at about 130° C. By heating to about 150° C., about 35 parts by weight of the above masked isocyanate are added thereto. The result is a lacquer which, upon being baked at temperatures higher than about 180° C. yields a hard elastic film which is very suitable for the insulation of electric conductors.

*Example 20*

About 356 parts by weight of m-cresol are run at about 160° C. into about 522 parts by weight of 2,4-toluylene diisocyanate. After the reaction has taken place, the product containing free isocyanate groups is left for about 2 hours more at about 170° C. After adding about 2.6 parts by weight of permethylated triethylene tetramine, the heating is continued for about 3 hours more at about 170° C. The product is clearly soluble in ethyl acetate and methyl glycol acetate, and contains about 14.4% of urethane groups bonded to cresol. There are no longer any free isocyanate groups. If about 420 parts by weight of m-cresol are used instead of about 356 parts by weight thereof, it is only after about 5.5 hours under the same conditions that a product is obtained which contains the same percentage of urethane groups bonded to cresol. The properties as regards solubility remain unchanged.

About 100 parts by weight of a condensation product obtained from equal parts of a polyester, prepared from about 2 mols of terephthalic dimethyl ester, about 2 mols of trimethylol propane and about 1 mol of ethylene glycol, and a polysiloxane containing hydroxyl groups and obtained by hydrolysis of about 1.00 mol of dimethyl dichlorosilane, about 1.00 mol of diphenyl dichlorosilane, about 1.40 mols of methyl trichlorosilane, and about 0.54 mol of phenyl trichlorosilane are dissolved in about 100 parts of a solvent mixture consisting of methyl glycol acetate and butanol, toluene in the ratio of 1:1:1. About 25 parts by weight of the masked isocyanate having about 14% by weight of NCO groups attached to cresol, are added thereto with slight elevation of temperature. This lacquer hardens upon being baked at temperatures above about 170° C. and is excellently suitable for impregnating magnet coils of electrical appliances and machines.

*Example 21*

About 348 parts by weight of toluylene diisocyanate are first of all heated to about 90° C. About 286 parts by weight of n-octyl alcohol are then gradually run into the said diisocyanate while stirring and using slight external cooling. The reaction product has about 11.7% of free isocyanate groups. After adding about 0.755 part by weight of permethylated diethylene triamine-triethylene tetramine mixture, the reaction mixture is slowly heated to about 160° C. After a reaction period of about 70 minutes, the product still has about 2.8% of isocyanate groups and after about 2 hours and 20 minutes it still has about 0.48% isocyanate groups, while it is no longer possible to detect any isocyanate content after heating for about 5 hours at about 165° C. The product is a resin which is spring-hard at room temperature and which is clearly soluble in ethyl acetate.

The resin when combined with the polyester solutions of Examples 1, 3, 5, 6, 7 and 8 yields a stoving lacquer resistant to any organic solvents when heated to temperatures above about 220° C.

*Example 22*

About 70.4 parts by weight of methanol are gradually added at from about 80 to about 100° C. to about 348 parts by weight of an isomer mixture consisting of 2,4- and 2,6-toluylene diisocyanate while stirring and cooling. After further heating for about 1 hour at about 100° C., it is possible to detect an isocyanate content of about 17.8% by amine titration. The reaction product is heated after about 4 hours to about 170° C. and then mixed with about 0.15 part by weight of permethylated diethylene triamine. The temperature then rises to about 180° C. After further heating for about 1 hour at about 180° C., a final product is obtained which is clearly soluble in any proportion in acetic ester and which no longer contains any isocyanate groups.

If no tertiary amine is added, it is necessary to heat for about 22 hours at about 170° C. in order to form a corresponding end product without free isocyanate groups.

About 400 parts by weight of about a 50% solution of this masked isocyanate in methyl glycol acetate-butyl acetate (1:1) are mixed with about 300 parts by weight of the hydroxyl groups containing polyester solution of Example 10. This solution is brushed onto metal surfaces, the metal then being baked at a temperature above about 223° C. The lacquered metal is resistant to high temperatures.

*Example 23*

About 554 parts by weight of an isomer mixture of 2.4- and 2,6-toluylene diisocyanate are reacted at about 170° C. with about 446 parts by weight of cresol (isomer mixture). There are then added about 111 parts by weight of o-dichlorobenzene and about 100 parts by weight of phenyl isocyanate, as well as about 10 parts by weight of about a 10% solution of permethylated diethylene triamine in o-dichlorobenzene, and the mixture is heated while constantly stirring for about 6½ hours at about 170° C. The resinous reaction product has about 11.1% of isocyanate groups bonded to cresol and is soluble in any proporiton in acetic ester.

About 380 parts by weight of the above polymerization product are dissolved while stirring at from about 110 to about 120° C. in about 1600 parts by weight of about a 25% solution of a polyester prepared from about 6.8 mols of terephthalic acid dimethyl ester, about 1.2 mols of isophthalic acid dimethyl ester, about 6.0 mols of ethylene glycol, and about 3.0 mols of glycerol. The polyester contains about 4.7% OH and has an acid number of about 1.6. A suitable solvent is a mixture of cresol and solvent naptha (2:2). In this way a lacquer is prepared which yields, when baked at temperatures higher than about 200° C., a hard but rather elastic and resistant film. The product is especially suitable for lacquering magnet wires.

*Example 24*

About 122 parts by weight of 1,3-dimethyl-4,6-bis-(β-isocyanate ethyl)-benzene are mixed while stirring at from about 50 to about 60° C. with about 16.8 parts by weight of methanol. About 0.2 cc. of about a 10% solution of permethylated triethylene tetramine in o-dichlorobenzene is added to the reaction product containing about 14.5% of isocyanate groups and the complete mixture is heated within about 1 hour to from about 175° C. to about 180° C. The isocyanate content is now about 12.4%. The temperature then rises with about half an hour without external heat to about 240° C. After cooling, there is left a transparent, spring-hard resin which is clearly soluble in methyl glycol acetate and which no longer contains any free isocyanate groups.

If this resin in solution with a polyhydroxy compound is baked onto a surface at temperatures above about 220° C., a lacquer is obtained which is very resistant against solvents.

*Example 25*

About 131 parts by weight of dicyclohexylmethane-4,4'-diisocyanate and about 16.8 parts by weight of methanol are slowly heated to about 130° C. after adding about 2 cc. of about a 10% solution of permethylated diethylene triamine in o-dichlorobenzene, the methanol introduced initially boiling under reflux. After the boiling has ceased, which is the case after heating for about 2 hours, the temperature is raised to about 175° C. (isocyanate content about 13.5%). After heating for about 15 hours, the resinous product which is readily soluble in cyclohexanone no longer contains any free isocyanate groups.

If this resin in solution with a polyhdroxy compound is baked onto a surface at temperatures above about 220° C., a lacquer is obtained which is very resistant against solvents.

*Example 26*

About 696 parts by weight of an isomer mixture consisting of 2,4- and 2,6-toluylene diisocyanate are initially reacted with about 562 parts by weight of a technical cresol mixture at from about 160° C. to about 170° C. as described in Example 12. The solution of about 145 parts by weight of dibutylamine in about 137 parts by weight of o-dichlorobenzene is then added in the course of about 1 hour by constantly stirring. After adding about 1.2 parts by weight of permethylated tetraethylene tetramine, the heating is continued for about 16 hours more at from about 170° C. to about 175° C. The resinous polymer is soluble in acetic ester and contains about 9.3% of isocyanate groups bonded to cresol.

If this resin in solution with a polyhydroxy compound is baked onto a surface at temperatures above about 160° C., a lacquer is obtained which is very resistant against solvents.

*Example 27*

About 100 parts by weight of polyamide, which was obtained by condensation of ε-caprolactam, are dissolved in about 500 parts by weight of cresol and about 50 parts by weight of diacetone alcohol while heating. This solution has added thereto about 20 parts by weight of a masked polyisocyanate, which was obtained from toluylene diisocyanate and cresol by heating in the presence of small amounts of a tertiary amine according to the Example 13.

A lacquer is obtained which, upon being baked at temperatures higher than about 180° C., yields elastic and resistant films and is suitable for lacquering magnet wires.

*Example 28*

About 522 parts by weight of toluylene diisocyanate are mixed at from about 50° C. to about 60° C. with about 200 parts by weight of trimethylol propane diallyl ether. To this mixture about 244 parts by weight of phenol are added at from about 150° C. to about 160° C. within about 1 hour. After adding about 0.96 part by weight of permethylated diethylene triamine, the reaction mixture is left standing for about 10 hours at about 170° C. The resin-like polymerization product thus obtained contains about 8.7% isocyanate groups bonded to phenol.

About 15 parts by weight of this product are dissolved in about 15 parts by weight of methyl glycol acetate and mixed with about 20 parts by weight of about a 50% ethyl acetate solution of a polyester containing about 3.4% OH. The polyester has been prepared from about 3 mols of adipic acid, about 3 mols of maleic acid anhydride, and about 7.5 mols of ethylene glycol. An elastic coating is obtained which exhibits good adhesion properties when a film of this formulation is baked at about 180° C.

*Example 29*

About 100 parts by weight of a branched polythioether (OH number 280) obtained from about 7.0 mols of thiodiglycol, about 5.0 mols of 1,4-butanediol, about 1.5 mols of trimethylol propane and about 1.5 mols of oxethylated diphenylol propane (OH number 380) are dissolved in a solvent mixture consisting of equal parts of toluene, ethyl acetate, butyl acetate and methyl glycol acetate. To this solution about 110 parts by weight of the masked isocyanate obtained according to Example 12 from toluylene diisocyanate and phenol by heating in the presence of a small amount of a tertiary amine are added.

When baking this combination at a temperature above about 180° C., a lacquer is obtained being highly resistant against water and chemical action. Instead of a branched polythioether, a linear polythioether which contains a diol instead of trimethylol propane can be used as well.

Example 30

A solution of about 100 parts by weight of a poly-1,4-butylene glycol having an OH number of about 96 obtained by polymerizing tetrahydrofuran is mixed with about 100 parts by weight of a masked isocyanate obtained from toluylene diisocyanate, phenyl isocyanate and cresol by heating in the presence of a small amount of a tertiary amine according to Example 23.

This lacquer is hardened by baking at a temperature above about 160° C. to give an elastic film which is particularly suitable for impregnating glass silk fabrics.

Example 31

About 100 parts by weight of a polyether obtained by polymerizing 1,2-propylene oxide having an OH number of about 120 are dissolved in a mixture of equal parts of ethyl acetate, butyl acetate and cresol. To this mixture a methyl glycol acetate solution of about 75 parts by weight of a masked isocyanate prepared from p-phenylene diisocyanate and cresol by heating in the presence of a tertiary amine according to Example 16 is added.

A lacquer is obtained which, when baked above about 160° C., results in a temperature-resistant and elastic film.

Example 32

About 100 parts by weight of acetyl cellulose having an acetyl content of about 35% to about 40% and an OH content of about 0.7% are dissolved in a mixture of equal parts of methyl glycol acetate and methyl ethyl ketone. The solution is mixed with about 15 parts of a masked isocyanate prepared from toluylene diisocyanate and phenol by heating in the presence of a small amount of a tertiary amine according to Example 12. The lacquer obtained from this solution, when heated to above about 160° C., is insoluble in methyl glycol acetate.

Example 33

About 100 parts by weight of cellulose acetobutyrate having an acetyl content of about 29% and a butyryl content of about 14% are dissolved in a mixture of about 1 part of methyl glycol acetate and about 2 parts of methyl ethyl ketone. To this solution about 10 parts by weight of a masked isocyanate obtained by heating together toluylene diisocyanate and m-cresol in the presence of a small amount of a tertiary amine according to Example 17 are added.

When baked at a temperature above about 160° C., a glass clear film is obtained which shows a good resistance against organic solvents as compared with a non-cross-linked film.

Example 34

168 parts by weight of hexamethylene diisocyanate are mixed at room temperature with 160 parts by weight of malonic acid diethyl ester and 3 parts by weight of methanol in which 1 part by weight of sodium has been dissolved. After mixing these components the temperature rises to about 70° C. 0.3 part by weight of pentamethyl diethylene triamine are added to the reaction mixture which is then heated for 3 hours to about 140–160° C. During this operation the viscosity somewhat increases.

164 parts by weight of the reaction product are mixed with 280 parts by weight of a 25% solution in ethyl acetate of a polyester prepared from 3 mols of adipic acid and 4 mols of trimethylol propane the polyester having an OH content of 11.4%. A lacquer solution is obtained which when applied to a surface hardens after short heating to a temperature of about 180° C. A lacquer coating results which is resistant against organic solvents.

In the foregoing examples, where the term "tertiary amine" is used, it is to be understood that one of the following compounds is used: permethylated diethylene triamine, permethylated triethylene tetramine, dimethyl benzylamine, the reaction product of 1 mol of N-methyl diethanol amine and 2 mols of phenylisocyanate. It is also to be understood that the "small amounts" of catalyst in the foregoing examples are amounts within the range of from about 0.05 to about 1 part.

Although the invention has been described in considerable detail in the foregoing in order to properly illustrate the invention, it is to be understood that the purpose of such detail is solely to illustrate the embodiments of the invention and that modification can be made by those skilled in the art without departing from the spirit or scope of the invention except as is set forth in the claims.

What is claimed is:

1. As a new composition of matter, a coating composition adapted to form an elastic film when applied to a substrate and baked at temperatures above 180° C., said coating composition containing (1) a polyester having terminal hydroxyl groups prepared by esterification of a polyhydric alcohol and a member selected from the group consisting of a phthalic acid, a phthalic anhydride and an ester of a phthalic acid, said polyhydric alcohol being in excess of the amount stoichiometrically required for reaction with said group member, (2) a compound having the formula

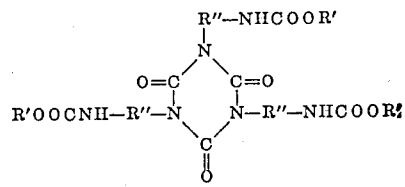

wherein R″ is an organic radical which was the nucleus of a monomeric organic polyisocyanate and R′ is an organic radical derived by removing a reactive hydrogen atom from a member selected from the group consisting of a phenol, an aliphatic alcohol, an aromatic alcohol, and a compound containing enolizable hydrogen, and (3) an inert organic solvent therefor.

2. The coating composition of claim 1 wherein the polyester is prepared from both an aliphatic dicarboxylic acid and a member selected from the group consisting of a phthalic acid, a phthalic anhydride and an ester of a phthalic acid and a monohydric alcohol.

3. The coating composition of claim 1 wherein the polyester is prepared by esterification of an aliphatic glycol and an aliphatic trihydric alcohol and a member selected from the group consisting of a phthalic acid, a phthalic anhydride and an ester of a phthalic acid and a monohydric alcohol.

4. The coating composition of claim 1 containing from about 20 to about 50 percent of the trimer illustrated by the chemical formula and wherein the polyester is prepared from terephthalic acid, ethylene glycol and glycerin.

5. The coating composition of claim 1 wherein the polyester is prepared from dimethylterephthalate, ethylene glycol and glycerin.

6. The coating composition of claim 1 wherein the polyester is prepared from dimethylterephthalate, ethylene glycol and glycerin and the trimer illustrated by the chemical formula is prepared from toluylene diisocyanate and cresol.

7. A method for coating a substrate which comprises applying to the substrate a coating composition containing (1) a compound having the formula

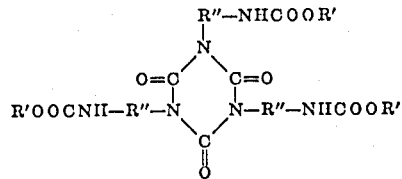

wherein R″ is an organic radical which was the nucleus of a monomeric organic polyisocyanate and R′ is an organic radical derived from a member selected from the group consisting of a phenol, an aliphatic alcohol, an aromatic alcohol, and a compound containing enolizable hydrogen, (2) a polyester having terminal hydroxyl groups prepared by esterification of a polyhydric alcohol and a member selected from the group consisting of a phthalic acid, an ester of a phthalic acid and a phthalic anhydride, said polyhydric alcohol being in excess of the amount stoichiometrically required for reaction with said group member, and (3) an inert organic solvent therefor, and thereafter removing said solvent.

8. The process of claim 7 wherein the polyester is prepared from dimethylterephthalate, ethylene glycol and glycerin and the trimer illustrated by the chemical formula is prepared from toluylene diisocyanate and cresol.

9. A method for coating an electrical conductor which comprises applying to the conductor a coating composition containing (1) a compound having the formula

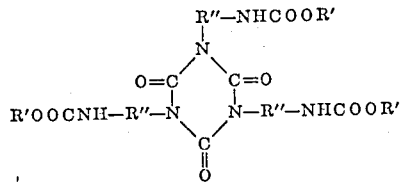

wherein R″ is an organic radical which was the nucleus of a monomeric organic polyisocyanate and R′ is an organic radical derived from a member selected from the group consisting of a phenol, an aliphatic alcohol, an aromatic alcohol, and a compound containing enolizable hydrogen, (2) a polyester having terminal hydroxyl groups prepared by esterification of a polyhydric alcohol and a member selected from the group consisting of a phthalic acid, an ester of a phthalic acid and a phthalic anhydride, said polyhydric alcohol being in excess of the amount stoichiometrically required for reaction with said group member, and (3) an inert organic solvent therefor, and thereafter removing said solvent.

10. An electrical conductor having insulation comprising the reaction product of (1) a compound having the formula

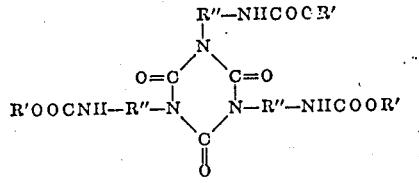

wherein R″ is an organic radical which was the nucleus of a monomeric organic polyisocyanate and R′ is an organic radical derived from a member selected from the group consisting of a phenol, an aliphatic alcohol, an aromatic alcohol, and a compound containing enolizable hydrogen and (2) a polyester having terminal hydroxyl groups prepared by esterification of a polyhydric alcohol and a member selected from the group consisting of a phthalic acid, an ester of a phthalic acid and a phthalic anhydride, said polyhydric alcohol being in excess of the amount stoichiometrically required for reaction with said group member.

11. A dried film comprising the reaction product of (1) a compound having the formula

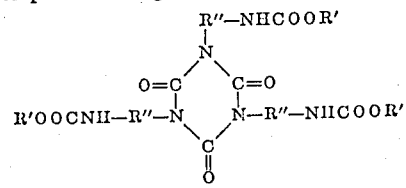

wherein R″ is an organic radical which was the nucleus of a monomeric organic polyisocyanate and R′ is an organic radical derived from a member selected from the group consisting of a phenol, an aliphatic alcohol, an aromatic alcohol, and a compound containing enolizable hydrogen and (2) a polyester having terminal hydroxyl groups prepared by esterification of a polyhydric alcohol of a member selected from the group consisting of a phthalic acid, an ester of a phthalic acid and a phthalic anhydride, said polyhydric alcohol being in excess of that stoichiometrically required for reaction with said group member.

12. As a new composition of matter, a coating composition adapted to form an elastic film wher applied to a substrate and baked at temperatures above 180° C., said coating composition containing (1) a polyester having terminal hydroxyl groups prepared by esterification of a polyhydric alcohol and a member selected from the group consisting of a phthalic acid, a phthalic anhydride, and an ester of a phthalic acid, said polyhydric alcohol being in excess of the amount stoichiometrically required for reaction with said group member; (2) the reaction product of one mol of a compound having the formula:

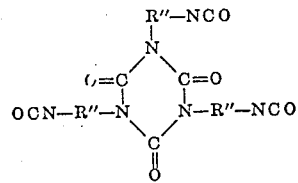

wherein R″ is an organic radical which was the nucleus of a monomeric organic polyisocyanate with three mols of a secondary amine having the hydrogen atom attached to the nitrogen atom as the only group reactive with an —NCO group; and (3) an inert organic solvent therefor.

References Cited in the file of this patent

UNITED STATES PATENTS

| | | |
|---|---|---|
| 2,536,849 | Kaiser et al. | Jan. 2, 1951 |
| 2,580,468 | Shaefer et al. | Jan. 1, 1952 |
| 2,671,082 | Stallman | Mar. 2, 1954 |
| 2,729,618 | Muller et al. | Jan. 3, 1956 |
| 2,730,518 | Birley et al. | Jan. 10, 1956 |
| 2,762,797 | Hechenbleikner | Sept. 11, 1956 |
| 2,801,244 | Balon | July 30, 1957 |
| 2,801,990 | Seegar et al. | Aug. 6, 1957 |
| 2,855,421 | Bunge et al. | Oct. 7, 1958 |
| 2,916,403 | Calderwood | Dec. 8, 1959 |
| 2,935,487 | Fox et al. | May 3, 1960 |

OTHER REFERENCES

Petersen: Liebigs Annalen der Chemie 562, 205–229 (1949).

UNITED STATES PATENT OFFICE
CERTIFICATE OF CORRECTION

Patent No. 3,115,479                  December 24, 1963

Erwin Windemuth et al.

It is hereby certified that error appears in the above numbered patent requiring correction and that the said Letters Patent should read as corrected below.

Column 2, lines 30 and 32, and column 3, lines 9 and 11, for "diisocyanate", each occurrence, read -- polyisocyanate --.

Signed and sealed this 9th day of June 1964.

(SEAL)
Attest:

ERNEST W. SWIDER
Attesting Officer

EDWARD J. BRENNER
Commissioner of Patents